(12) United States Patent
Tung et al.

(10) Patent No.: US 8,578,074 B2
(45) Date of Patent: Nov. 5, 2013

(54) FIRST IN FIRST OUT DEVICE AND METHOD THEREOF

(75) Inventors: Hsu-Jung Tung, Hsin Chu County (TW); Sen-Huang Tang, Hsin Chu (TW)

(73) Assignee: Realtek Semiconductor Corp., Hsinchu (TW)

( * ) Notice: Subject to any disclaimer, the term of this patent is extended or adjusted under 35 U.S.C. 154(b) by 0 days.

(21) Appl. No.: 13/538,396

(22) Filed: Jun. 29, 2012

(65) Prior Publication Data

US 2013/0007314 A1    Jan. 3, 2013

(30) Foreign Application Priority Data

Jul. 1, 2011    (TW) .............................. 100123335 A (51) Int. Cl.
*G06F 1/00* (2006.01)
(52) U.S. Cl.
USPC .............................................. 710/52; 326/96
(58) Field of Classification Search
None
See application file for complete search history.

(56) References Cited

U.S. PATENT DOCUMENTS

| | | | | |
|---|---|---|---|---|
| 5,841,750 | A * | 11/1998 | Suzuki et al. | 369/47.35 |
| 6,594,329 | B1 * | 7/2003 | Susnow | 375/372 |
| 6,900,665 | B2 * | 5/2005 | Ma | 326/94 |
| 7,180,891 | B1 * | 2/2007 | Hoang | 370/386 |
| 7,263,149 | B2 * | 8/2007 | Ware et al. | 375/354 |
| 7,725,625 | B2 * | 5/2010 | Dockser et al. | 710/53 |
| 7,737,752 | B2 * | 6/2010 | Eaton et al. | 327/294 |
| 7,793,021 | B2 * | 9/2010 | Priel et al. | 710/106 |
| 8,014,485 | B2 * | 9/2011 | Kwan et al. | 375/376 |
| 8,266,405 | B2 * | 9/2012 | Khodabandehlou et al. | 711/167 |
| 8,352,774 | B2 * | 1/2013 | Elrabaa | 713/600 |

* cited by examiner

*Primary Examiner* — Chendg-Yuan Tseng
(74) *Attorney, Agent, or Firm* — Muncy, Geissler, Olds & Lowe, PLLC (57) ABSTRACT

A FIFO device crossing a first and a second power domains is provided. The device comprises: a plurality of input registers belonging to the first power domain for receiving the input signal, and each of the input register having a first output; a first controller belonging to the first power domain for enabling the registers according to specific order and generating an initial signal; a multiplexer receiving the first outputs according to the specific order to generate a second output; a second controller belonging to second power domain, receiving the initial signal through an asynchronous interface and controlling the multiplexer to output second output; and an output register belonging to second power domain receiving the second output. First power domain operates according to a first clock signal. Second power domain operates according to a second clock signal. The first and second clock signals are asynchronous.

12 Claims, 10 Drawing Sheets

FIRST IN FIRST OUT DEVICE AND METHOD THEREOF

BACKGROUND OF THE INVENTION (a) Field of the Invention

The invention relates to a first in first out device (FIFO) device, particularly to first in first out device (FIFO) device, crossing different power domains.

(b) Description of the Related Art

In digital circuits, clock signals are used to define clock reference of data flow in circuits and, in order to have each element driven by the clock signal in the circuit receive the clock signal, generally a clock tree is generated from one point of the clock signal or its source to be used by the internal elements of an integrated circuit (hereinafter referred to as "IC"). But, there is delay between the clock signals before and after the clock tree is generated to result in necessity of correspondingly adjusting data hold time.

Figure 1A:
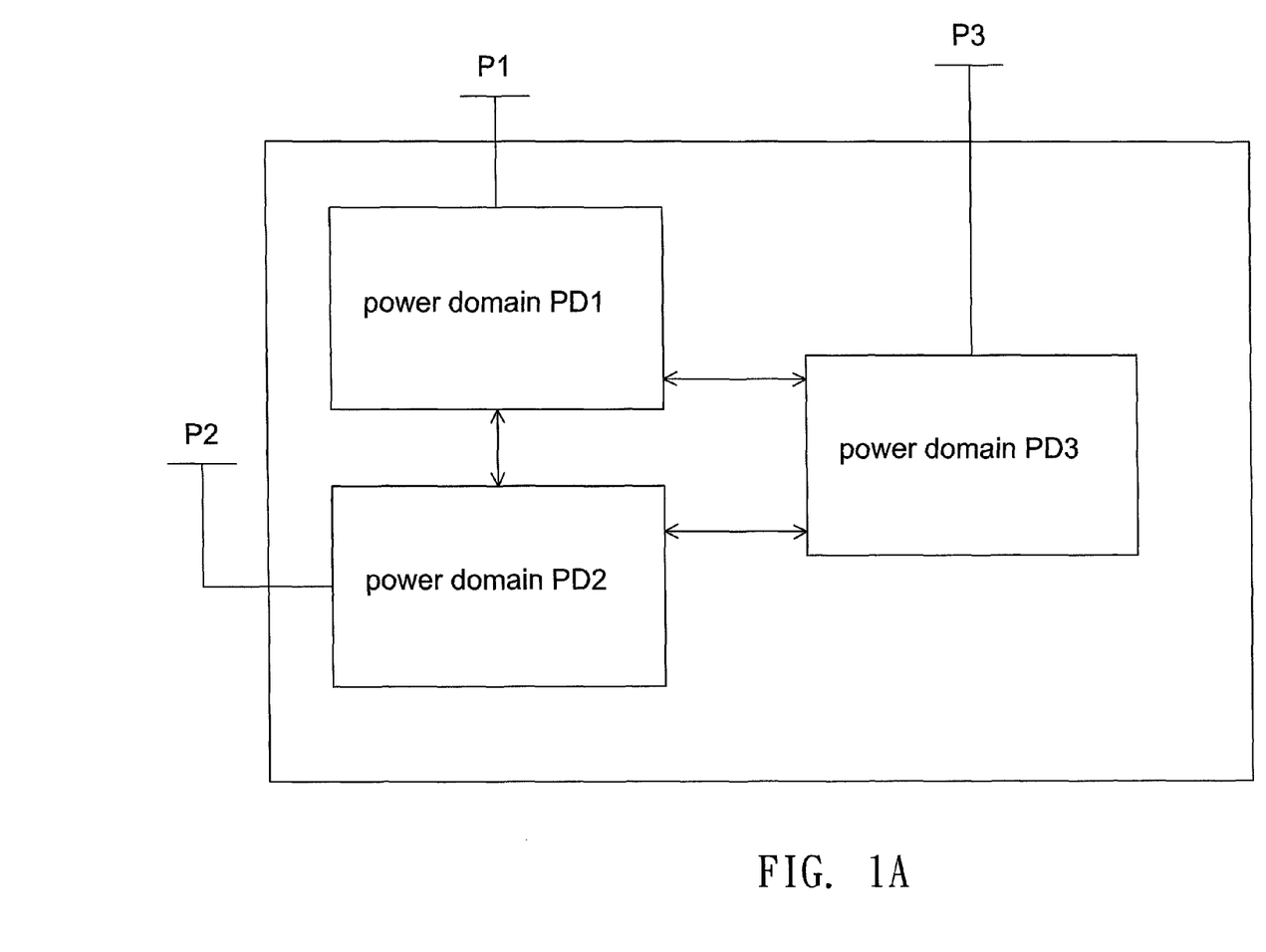
FIG. 1A shows a schematic diagram illustrating an IC divided into different power domains.

Accompanying with the rise of environmental protection consciousness, if an IC is under power down or power saving, low power consumption of the IC is critically required and the solution based on the current technology is to divide the IC into different power domains. As shown in FIG. 1A, the IC is divided into three different power domains PD1~PD3 and the power domains PD1~PD3 have corresponding power sources P1~P3. Under power down or power saving, only the power domain for executing enabling and the corresponding power source are remained to minimize power consumption.

Figure 1B:
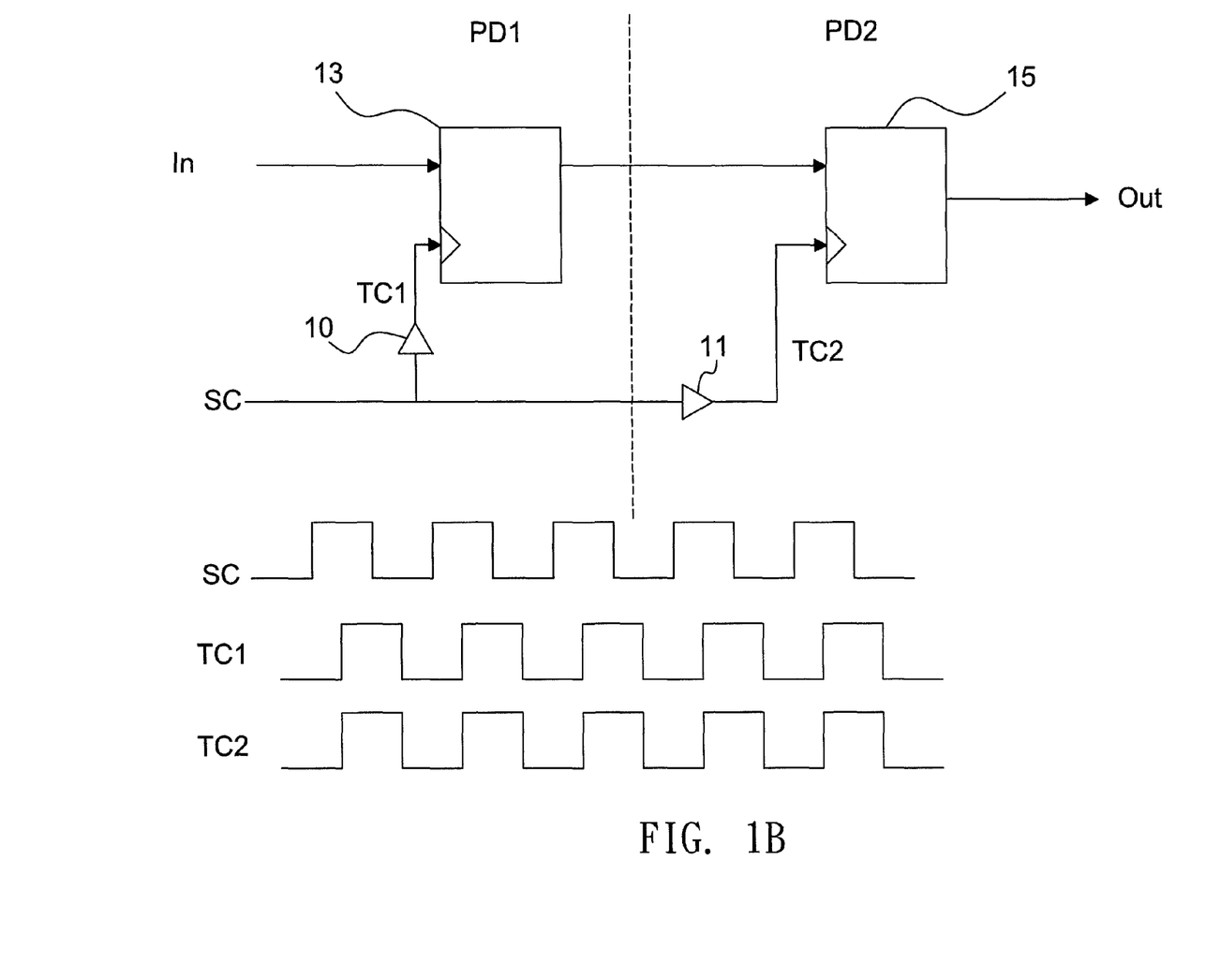
FIG. 1B shows a schematic diagram illustrating the ideal situation according to the prior art.

Please refer to FIG. 1B. FIG. 1B shows part of the circuit different power domains. As shown in FIG. 1B, 10 and 11 each represent a virtual buffer or a delay unit to show the delay generated between a source clock and the clock tree generated by the source clock. It should be noted that the buffers or delay units 10 and 11 are expression of delay only but not actual buffers or delay units. The actual buffer of the clock tree is not labeled.

The source end (power domain PD1) in FIG. 1B is provided with an input register 13 to receive an input signal In driven by the first clock signal TC1 generated by the source clock SC through the delay unit 10. The data of the input signal In is transmitted from the input register 13 to the output register 15 at the back end and an output signal Out is outputted. The circuits of the first clock signal TC1 and the second clock signal TC2 outputted by the delay units 10 and 11 are generated by clock tree synthesis. An ideal first clock signal TC1 and an ideal second clock signal TC2 are substantially the same (substantially line-up, or said, TC1 and TC2 have the same phase), shown in the timing diagram of the bottom of FIG. 1B.

Figure 1C:
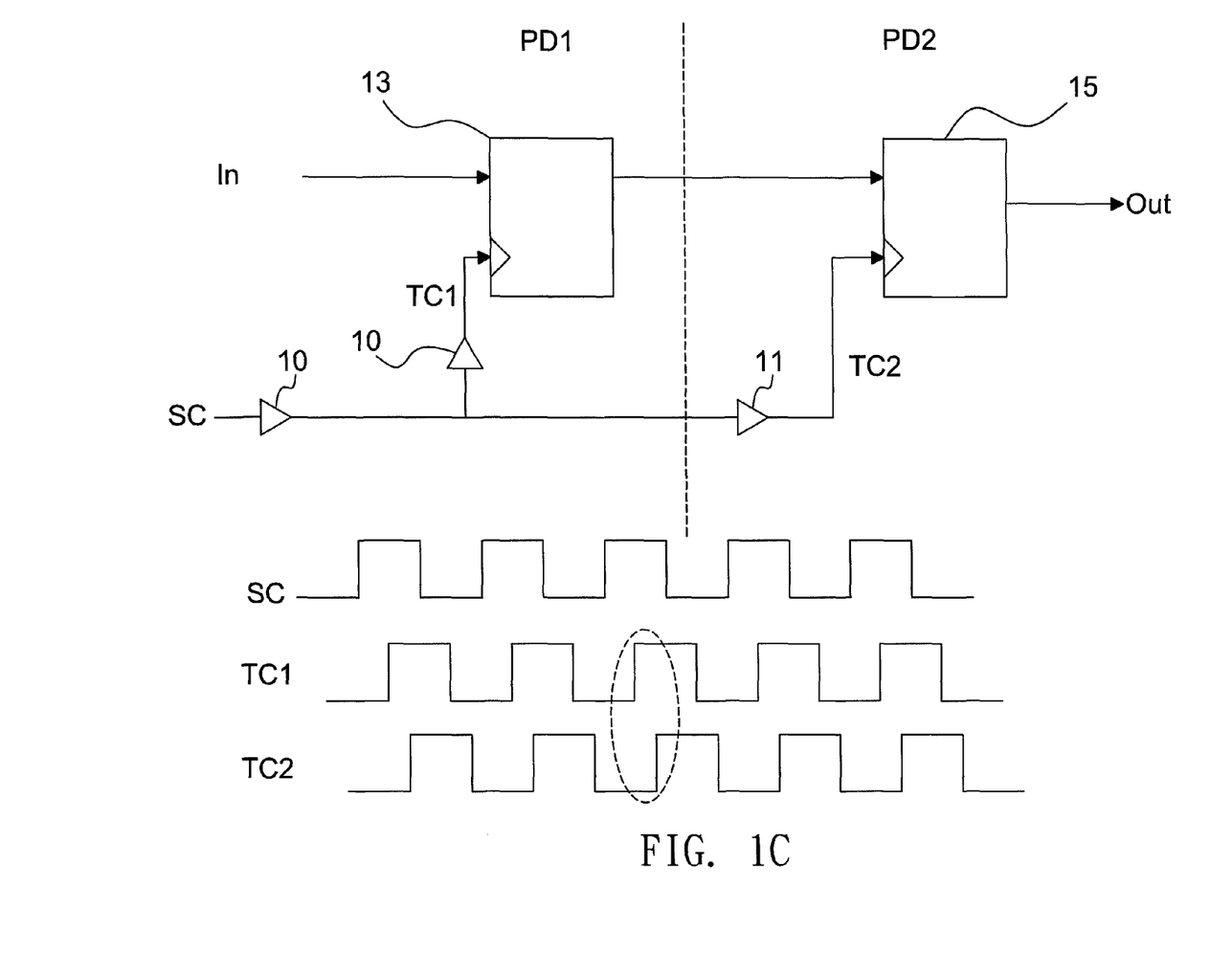
FIG. 1C shows a schematic diagram when the voltage supplied by the power domain PD1 is higher than that supplied by the power domain PD2 according to the prior art.

However, even though the voltage of different power domains is designed to be the same, the power consumption of each different power domain is still actually different and the voltage of the each power domain has different voltage drop so that the clock tree has different delay time variation. As shown in FIG. 1C, a schematic diagram having the above problem is shown. (Since data transmission still exists in different power domains, the power consumption of a different power domain is different even for synchronous data transmission. In terms of the circuits are operated under different power domains, the delay time would also be changed and different on the clock tree even if it is a synchronous system. From the timing diagram shown at the bottom of FIG. 1C, it can be understood that the voltage supplied by the power domain PD1 is higher than that by the power domain PD2 to have the first clock signal TC1 is faster than the second clock signal TC2, at the location circled by the dashed line, to generate hold time violation.

Figure 1D:
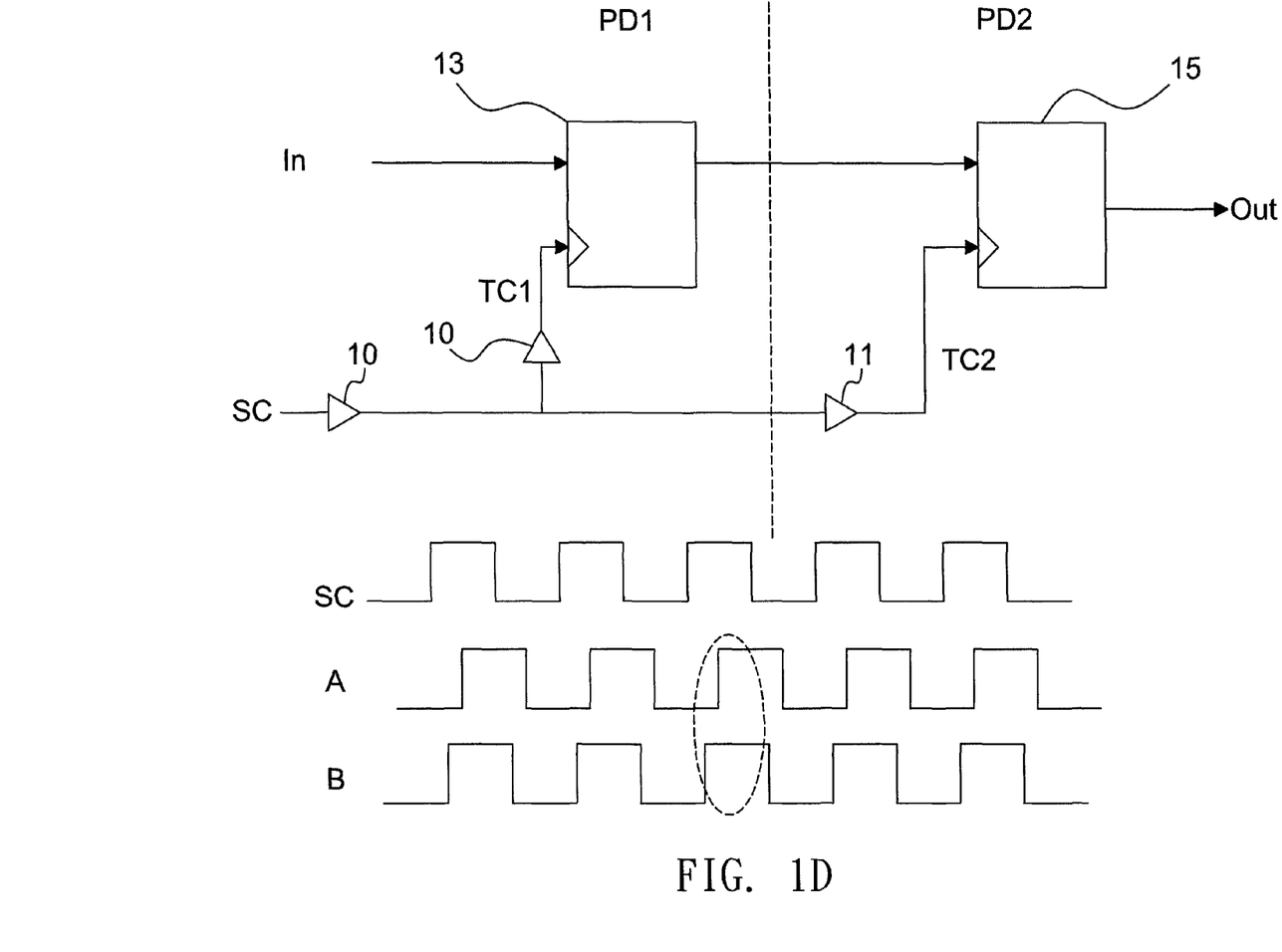
FIG. 1D shows a schematic diagram when the voltage supplied by the power domain PD2 is higher than that supplied by the power domain PD1 according to the prior art.

On the contrary, please refer to FIG. 1D. From the timing diagram shown at the bottom of FIG. 1D, it can be understood that the voltage supplied by the power domain PD2 is higher than that by the power domain PD1 to have the second clock signal TC2 is faster than the first clock signal TC1, at the location circled by the dashed line, to generate set up time violation.

BRIEF SUMMARY OF THE INVENTION

One object of the invention is to provide a first in first out device (FIFO) device and method thereof to solve the problem of having set up time violation or hold time violation due to voltage difference while crossing different power domains.

One embodiment of the invention provides a first in first out device (FIFO) device, crossing a first power domain and a second power domain. The FIFO device receives an input signal and comprises a plurality of input registers, a first controller, a multiplexer, a second controller, and an output register. The input registers belong to the first power domain and receive the input signal where each of the input register has a first output. The first controller belongs to the first power domain and is used to enable the input registers according to specific order and generate an initial signal. The multiplexer belongs to the second power domain and receive the first outputs according to the specific order to generate a second output. The second controller belongs to the second power domain, receives the initial signal through an asynchronous interface and generates a control signal to control the multiplexer to output the second output. The output register belongs to the second power domain and receives the second output. The first power domain operates according to a first clock signal and the second power domain operates according to a second clock signal. The first clock signal and the second clock signal are coming from same source, thus, they have same frequency. But, the first and second clock signals can be deemed as asynchronous since the clock tree is varied according to power, and it is therefore the phase will be different.

Furthermore, one embodiment of the invention provides a method for a first in first out device (FIFO) device, crossing a first power domain and a second power domain. The method comprises the following steps: receiving an input signal by a plurality of input registers wherein each of the input registers comprises a first output; enabling the input registers according to specific order by a first controller to generate an initial signal; receiving the first outputs by a multiplexer according to the specific order to generate a second output; receiving the initial signal through an asynchronous interface and generating a control signal to control the multiplexer to output the second output by a second controller; and receiving the second output by an output register.

The input registers and the controller belong to the first power domain; the multiplexer, the second controller, the asynchronous interface and the output register belong to the second power domain; the first power domain operates according to a first clock signal; the second power domain operates according to a second clock signal; and the first and the second clock signals are asynchronous, which have the same clock frequency but different phase since from the same root and pass through clock trees in different power domain.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 2A:
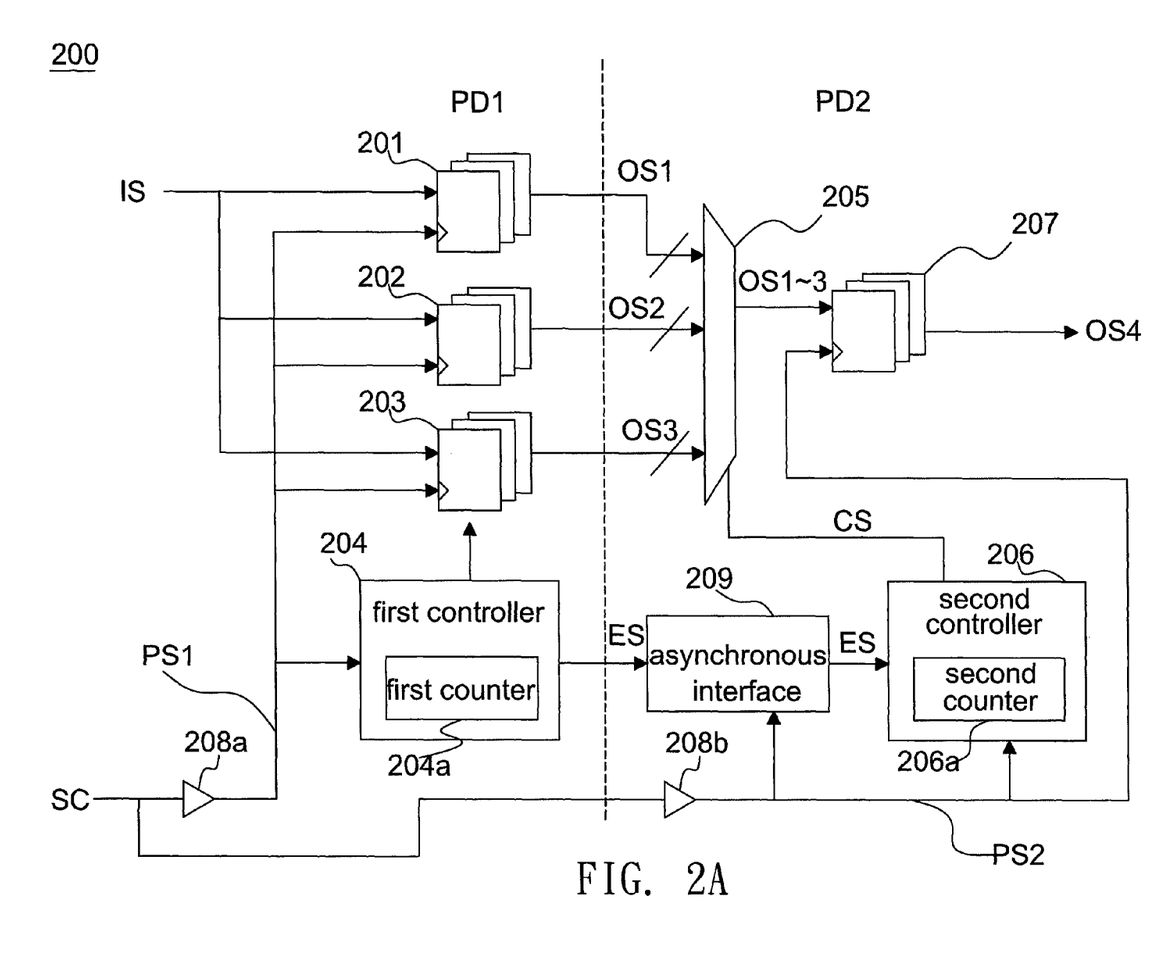
FIG. 2A shows a schematic diagram illustrating a first in first out device (FIFO) device according to one embodiment of the invention.

Please refer to FIG. 2A. FIG. 2A shows a schematic diagram illustrating a first in first out device (hereinafter referred to as "FIFO") device 200 according to one embodiment of the invention. The FIFO device 200 comprises power domains PD1 and PD2 and the power domains PD1 and PD2 have different supply voltage values either by design or due to different voltage drop although the original design is to have the same supply voltage.

In this embodiment, the FIFO device 200 comprises input registers 201~203, a first controller 204, a multiplexer 205, a second controller 206, an output register 207, delay units 208a~208b and an asynchronous interface 209. In one embodiment, the first controller 204 and the input registers 201~203 are disposed in the power domain PD1 while the multiplexer 205, the second controller 206, the output register 207, the delay units 208b and the asynchronous interface 209 are disposed in the power domain PD2.

It should be noted that the delay units 208a and 208b represent delay of the source clock signal SC generated by clock trees with different voltage values (or levels) or loads (wire length) of two power domains. Thus, the source clock signal SC, the clock signal of the clock tree, and the clock signals between different power domains are not synchronized and have a phase difference. For example, it is considered to be asynchronous when the source clock signal SC and the clock signal of the clock tree have the same frequency but have a phase difference. Since the power consumption difference between the power domains PD1 and PD2 exists or the originally designed supply voltage values of the power domains PD1 and PD2 are different, the delay of the clock tree varies with the difference of the supply voltage values of the power domains PD1 and PD2. Thus, the power domain PD1 operates according to a first clock signal PS1 and the power domain PD2 operates according to a second clock signal PS2 where the first clock signal PS1 and the second clock signal PS2 are the clock tree generated by the source clock signal SC.

It should be noted that the input registers 201~203 and the first controller 204 are driven by the first clock signal PS1 and the second controller 206 and the output register 207 are driven by the second clock signal PS2.

The input registers 201~203 are used to receive an input signal IS. The input signal IS can be a data comprising one-bit or a plurality of bits but the invention is not limited to this example. The input registers 201~203 separately generate first outputs OS1~OS3. The input registers 201~203 are separately coupled to the input terminal of the multiplexer 205.

The first controller 204 is separately coupled to the input registers 201~203 and drives the input registers 201~203 according to specific order so as to have the data of the input signal be written into the input registers 201~203.

When the first controller 204 generates an initial signal ES and transmits to the second controller 206, the first controller 204 starts operating. Since the first controller 204 belongs to the power domain PD1, the second controller 206 in PD2 receives the initial signal ES through the asynchronous interface 209.

The second controller 206 generates a control signal CS according to the initial signal ES to control the multiplexer 205 to generate the second output, wherein second output is one of the first outputs OS1~OS3. The output register 207 receives the second output to generate a second output OS4.

In one embodiment of the invention, the input registers 201~203 and the output register 207 are D flip-flops. Besides, the first controller 204 comprises a first counter 204a and the second controller 206 comprises a second counter 206a. The first counter 204a and the second counter 206a start to count according to the source clock signal SC or an enable signal. The second counter 206a counts from an initial value (for example, zero) after the second controller 206 receives the initial signal ES. The first controller 204 controls the order of the input registers 201~203 to sample the input signal IS according to the counting values of the first counter 204a and the second counter 206a controls the order of the output of registers 201~203 to be mux by multiplex 205.

Figure 2B:
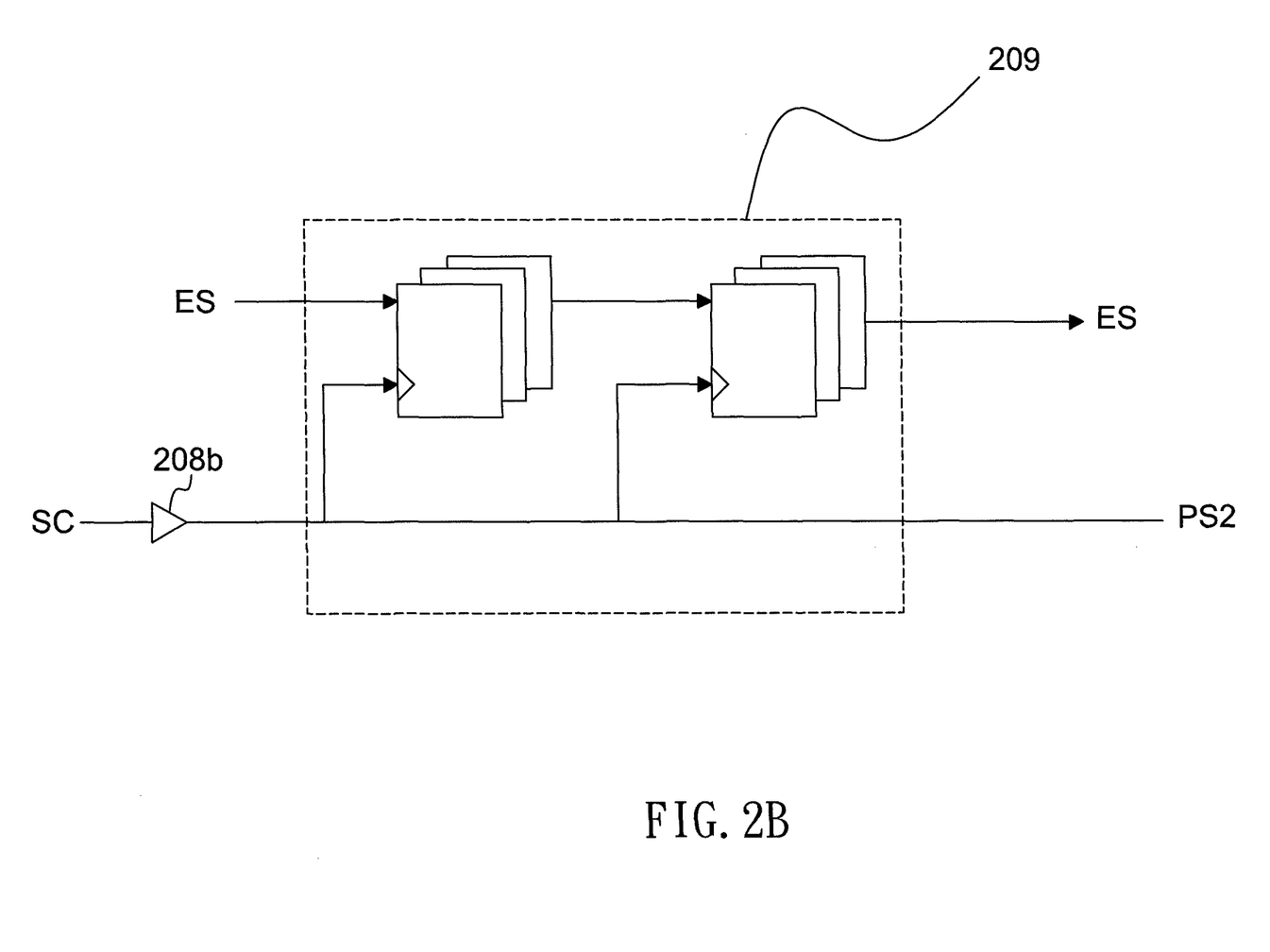
FIG. 2B shows a schematic diagram illustrating the asynchronous interface according to one embodiment of the invention.

FIG. 2B shows a schematic diagram illustrating the asynchronous interface according to one embodiment of the invention. In one embodiment, the asynchronous interface 209 can be implemented by a two-stage D flip-flop.

Figure 2C:
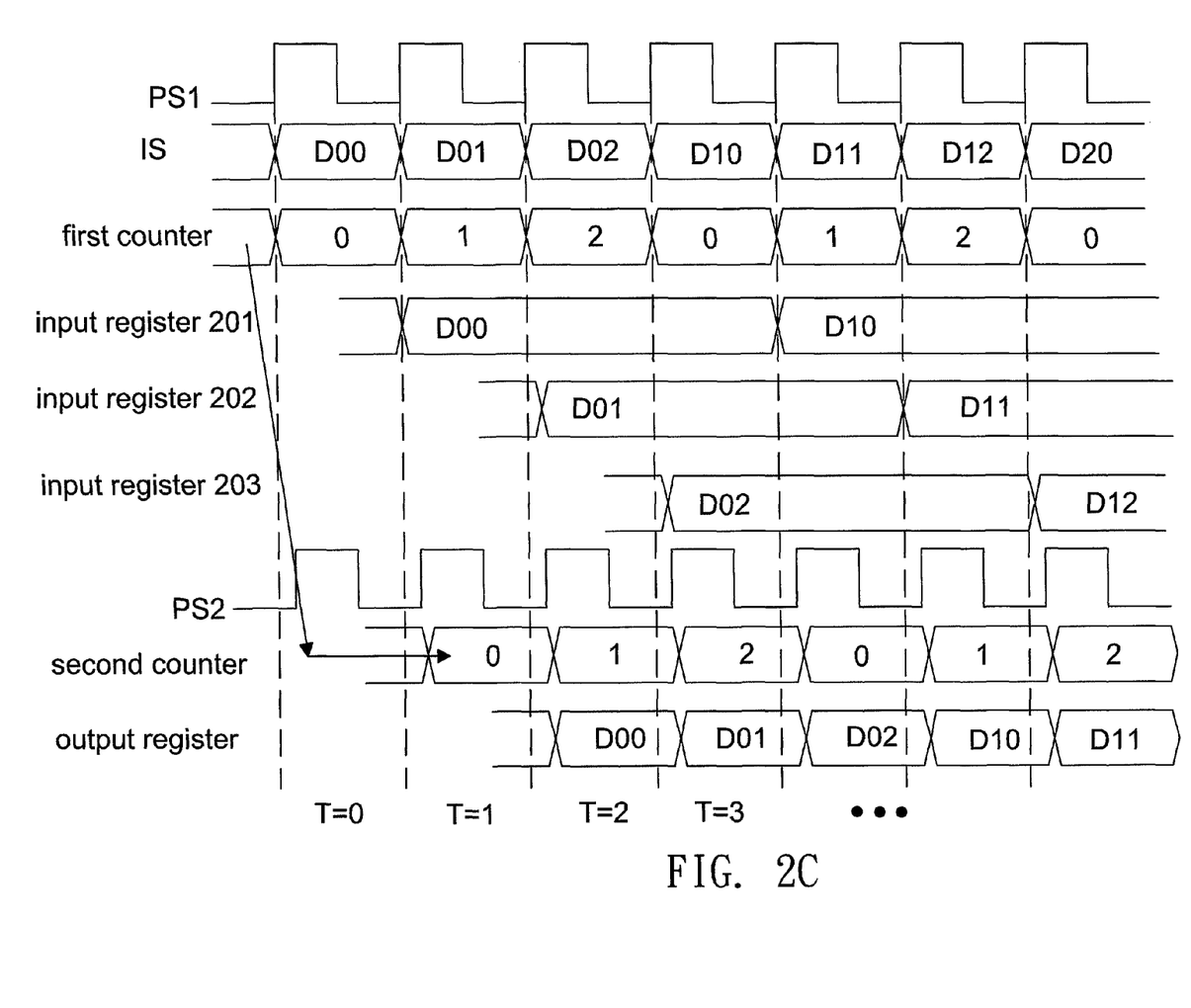
FIG. 2C shows a timing diagram of the first in first out device (FIFO) device where the voltage supplied by the power domain PD1 is higher than that supplied by the power domain PD2 according to one embodiment of the invention.
Figure 2D:
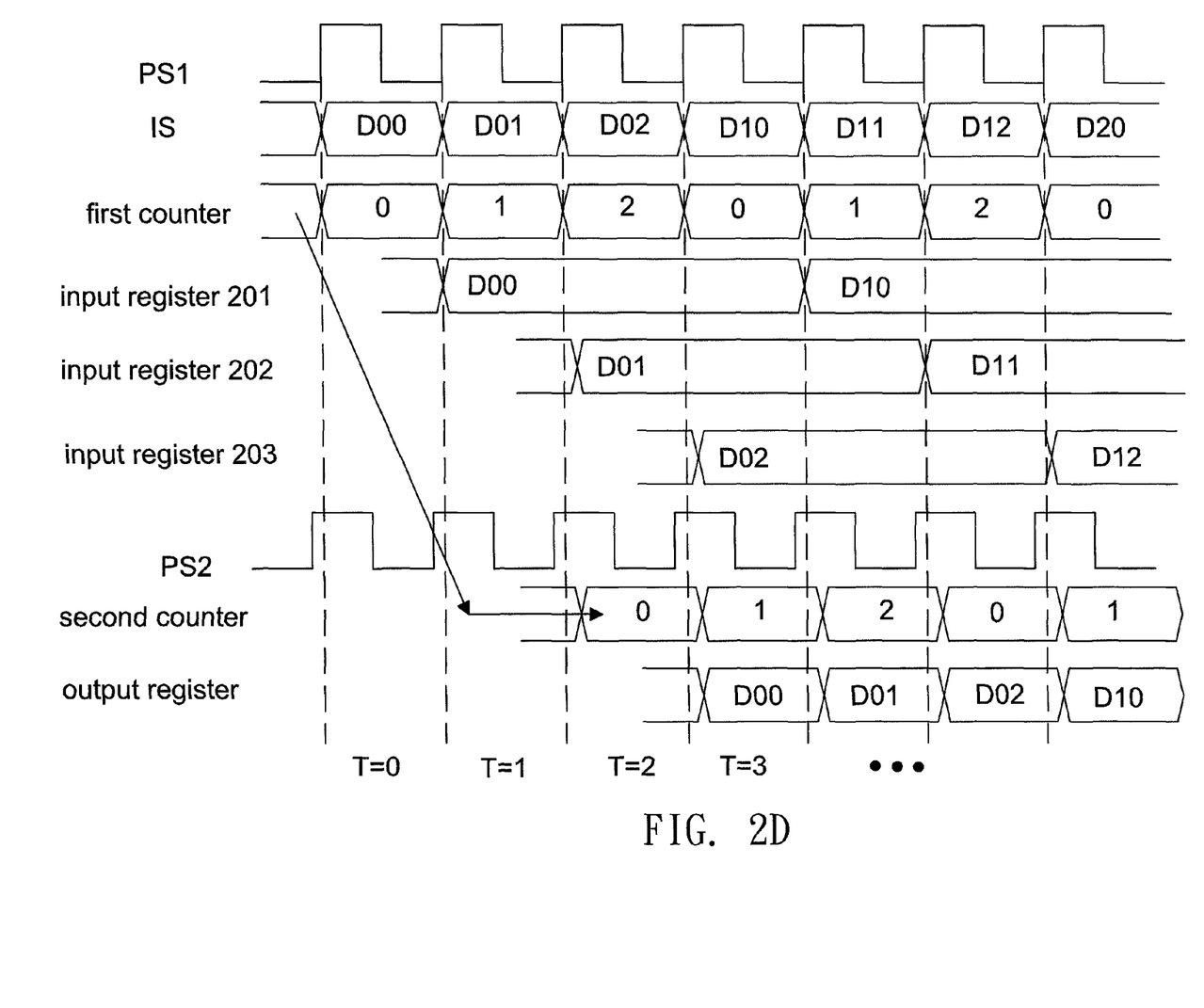
FIG. 2D shows a timing diagram of the first in first out device (FIFO) device where the voltage supplied by the power domain PD2 is higher than that supplied by the power domain PD1 according to one embodiment of the invention.

Please simultaneously refer to FIGS. 2C and 2D. FIG. 2C shows a timing diagram of the first in first out device (FIFO) device where the voltage supplied by the power domain PD1 is higher than that supplied by the power domain PD2 according to one embodiment of the invention. FIG. 2D shows a timing diagram of the first in first out device (FIFO) device where the voltage supplied by the power domain PD2 is higher than that supplied by the power domain PD1 according to one embodiment of the invention.

As shown in FIG. 2C, in this embodiment, there are three input register 201~203 in the FIFO device 200. Through the control of the first controller 204, the input signal IS is sequentially stored in the input register 201~203. For example, at T=0, the counting value of the first counter 204a is 0 and the first controller 204 controls the register 201 to sample the input signal IS (D00). At T=1, the counting value of the first counter 204a is 1 and the first controller 204 controls the register 202 to sample the input signal IS (D01) and the register 201 outputs the output OS1(D00). At T=2, the counting value of the first counter 204a is 2, the first controller 204 controls the register 203 to sample the input signal IS (D02), the register 201 outputs the output OS1(D00) and the register 202 outputs the output OS2(D01). At T=3, the counting value of the first counter is back to 0, the first controller 204 controls the register 201 to sample the input signal IS (D10) at the end of T3, the register 201 outputs the output OS1(D00), the register 202 outputs the output OS2(D01) and the register 203 outputs the output OS3(D02). The rest is analogous to the above description. Thus, the three input registers 201~203 separately sample the input signal IS sequentially and output an output signal sequentially. Since the FIFO device 200 has the three input registers 201~203, the output of each input register can hold for three periods (cycles).

In order to smoothly transmit the input signal IS from the power domain PD1 to the power domain PD2, in one embodiment of the invention, the asynchronous interface 209 and the first controller 206 are used to control output of the multiplexer 205. The detailed operation principle is described as follows.

In FIG. 2C, the voltage supplied by the power domain PD1 is higher than that supplied by the power domain PD2. Therefore, the first clock signal PS1 is ahead of the second clock signal PS2. Besides, in one embodiment, the asynchronous interface 209 is implemented by a second-order D flip-flop. The asynchronous interface 209 samples the initial signal ES outputted by the first controller 204 according to the second clock signal PS2 and then outputs to the second controller 206. For example, at T=0 in FIG. 2C, the asynchronous interface 209 samples the initial signal ES outputted by the first controller 204 according to the second clock signal PS2. Then, the asynchronous interface 209 transmits it to the second controller 206 at T=1 to have the second counter 206a in the second controller 206 count from 0 and at the same time the second controller 206 controls the multiplexer 205 to output the output OS1 (D00). Next, at T=2, the output register 207 outputs an output OS4 (D00). Thus, when the voltage supplied by the power domain PD1 is higher than that supplied by the power domain PD2, the input signal IS (D00) inputted into the FIFO device 200 at T=0 is outputted from the power domain PD2 at T=2. In other words, after the second counter 206a in the FIFO device 200 is triggered by the initial signal ES, the second counter 206a starts to count (0~2) according to the second clock signal PS2 to have the second controller 206 control the multiplexer 205 to output the outputs D00~Dnm of the registers 201~203 sequentially. Finally, the output register 207 outputs an output. Therefore, the configuration of the invention can solve the problem of the hold time between the first clock signal PS1 of the power domain PD1 and the second clock signal PS2 of the power domain PD2. It should be noted that, when the FIFO device 200 has three input registers 201~203, the output OS4 generated by the output register 207 is behind the input signal IS for at least two clock periods of the first clock signal PS1. In another embodiment, the FIFO device 200 has more than three input registers but the output OS4 will be behind the input signal IS for a longer period of time if there are more input registers.

The difference between FIG. 2D and FIG. 2C is that the voltage supplied by the power domain PD1 is lower than that supplied by the power domain PD2. Thus, the second clock signal PS2 is ahead of the first clock signal PS1. Because of the time for sampling the initial signal ES by the asynchronous interface 209, the second counter 206a actually is behind the first counter 204a for two clock periods. Thus, the input signal IS (D00) inputted into the FIFO device 200 at T=0 is outputted from the power domain PD2 at T=3. Under such design, from the timing diagram, it can be found that the output register 207 can still correctly access the data stored in the third-order input registers 201~203. Therefore, the problem of the setup time between the first clock signal PS1 of the power domain PD1 and the second clock signal PS2 of the power domain PD2 can be solved. It should be noted that, when the FIFO device 200 has three input registers 201~203, the second output OS4 generated by the output register 207 is closed to three cycles behind the input signal IS. In another embodiment, the FIFO device 200 has more than three input registers but the output OS4 will be behind the input signal IS for a longer period of time if there are more input registers.

Figure 3:
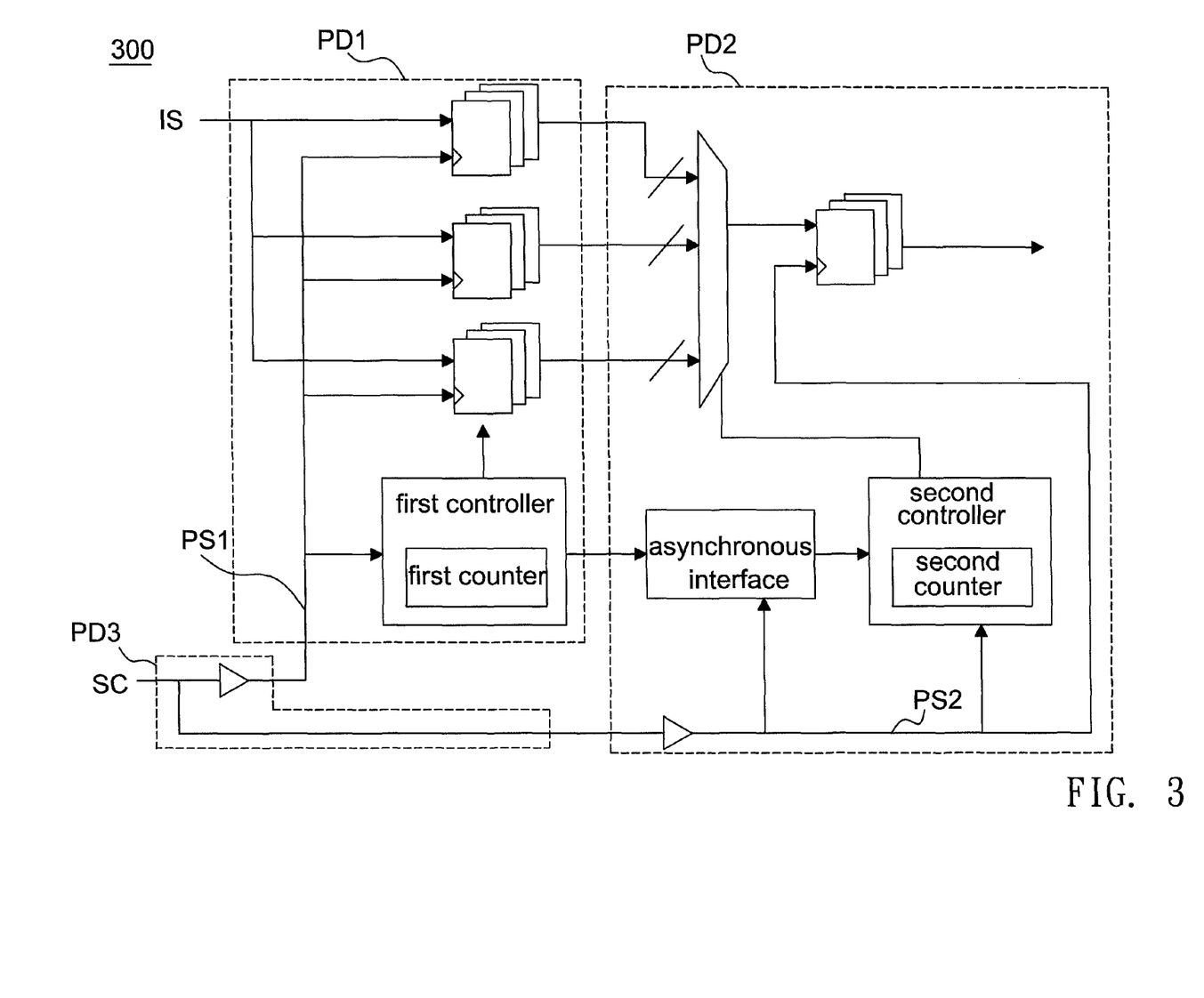
FIG. 3 shows a schematic diagram illustrating a first in first out device (FIFO) device according to one embodiment of the invention.
Figure 4:
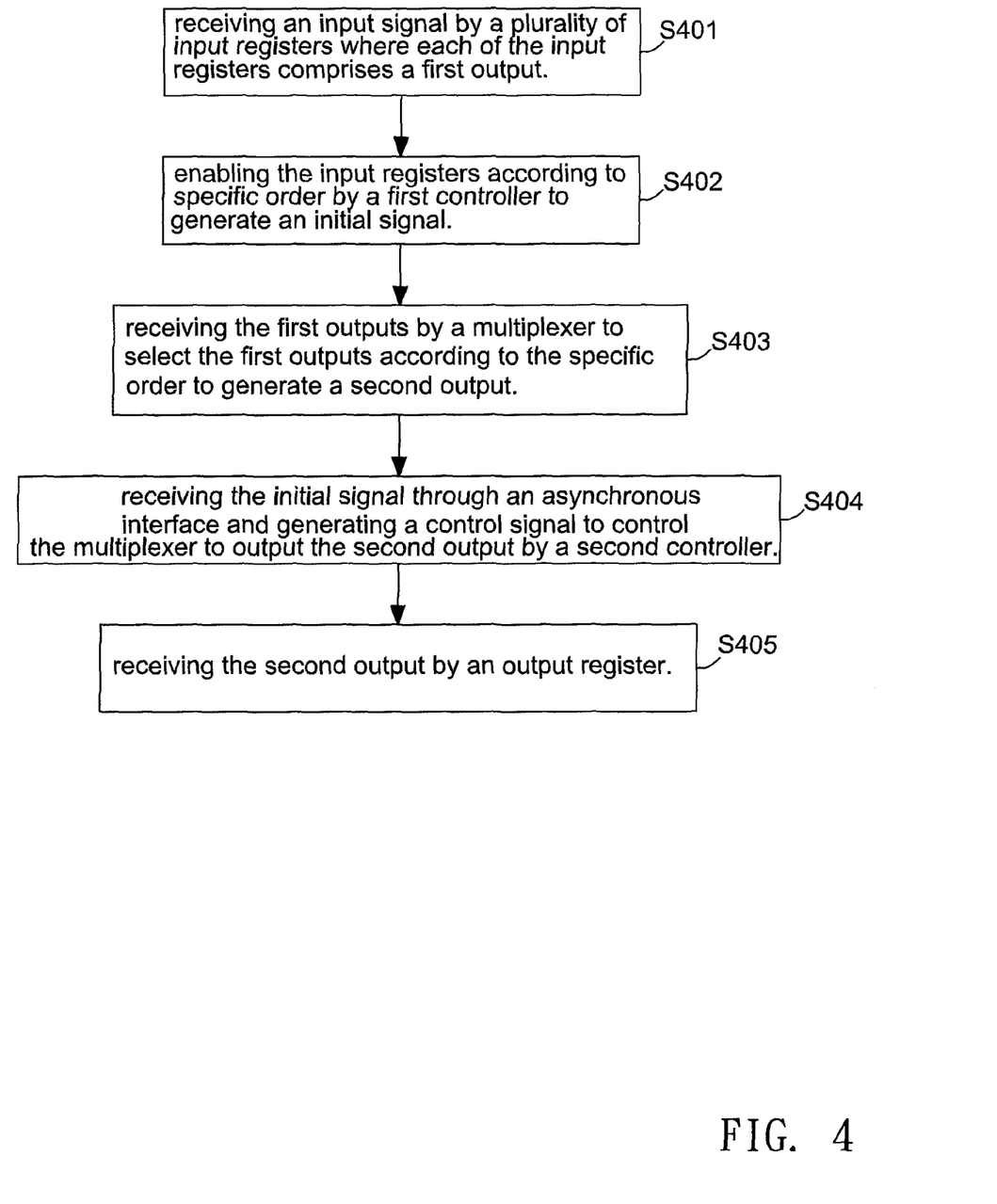
FIG. 4 shows a flow chart illustrating a first in first out device (FIFO) device according to one embodiment of the invention.

Please refer to FIG. 3. FIG. 3 shows a schematic diagram illustrating a first in first out device (FIFO) device according to one embodiment of the invention. The difference between the FIFO device 300 and the FIFO device 200 is that the source clock signal SC can belong to another power domain PD3 and at the time the first clock signal PS1 and the second clock signal PS2 operate according to the clock generated by the source clock signal SC but the three are driven by different power sources. The rest of the operation principle is the same as the above description and will be given hereinafter. Please refer to FIG. 4. FIG. 4 shows a flow chart illustrating a method for implementing a first in first out device (FIFO) device according to one embodiment of the invention. The method comprises the following steps:

Step S401: receiving an input signal by a plurality of input registers where each of the input registers comprises a first output;

Step S402: enabling the input registers according to specific order by a first controller to generate an initial signal;

Step S403: receiving the first outputs by a multiplexer to select the first outputs according to the specific order to generate a second output;

Step S404: receiving the initial signal through an asynchronous interface and generating a control signal to control the multiplexer to output the second output by a second controller; and Step S405: receiving the second output by an output register.

In the above, the input registers and the first controller belong to the first power domain; the multiplexer, the second controller, the asynchronous interface and the output register belong to the second power domain; the first power domain operates according to a first clock signal; the second power domain operates according to a second clock signal; and the first clock signal and the second clock signal are not synchronized or have a phase difference. In one embodiment, the second clock signal PS2 and the first clock signal PS1 are clock signals generated according to the source clock signal SC.

In conclusion, the FIFO device crossing two power domains according to the invention uses a plurality of registers in the first power domain to store the input signal sequentially to increase the periods for storing each input signal. Therefore, the circuit of the second power domain can have more time to read the data stored in the registers. Thus, the problem of set up time violation and hold time violation due to voltage difference during crossing different power domains can be solved.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A first in first out device (FIFO) device, crossing a first power domain and a second power domain, comprising:
 a plurality of input registers, belonging to the first power domain for receiving an input signal wherein each of the input register has a first output;
 a first controller, belonging to the first power domain for enabling the input registers according to specific order and generating an initial signal;
 a multiplexer, belonging to the second power domain for receiving the first outputs according to the specific order to generate a second output;
 a second controller, belonging to the second power domain for receiving the initial signal through an asynchronous interface and generating a control signal to control the multiplexer to output the second output; and
 an output register, belonging to the second power domain for receiving the second output;
 wherein the first power domain operates according to a first clock signal, and the second power domain operates according to a second clock signal.

2. The device according to claim 1, wherein the input registers comprise at least three input registers.

3. The device according to claim 1, wherein, when the input registers comprise at least three input registers and voltage supplied by the first power domain is higher than that by the second power domain, the second output is behind the first clock signal for at least two clock cycles.

4. The device according to claim 1, wherein, when the input registers comprise three input registers and voltage supplied by the first power domain is lower than that by the second power domain, the second output is substantially three cycles behind the first clock signal.

5. The device according to claim 1, wherein the output register and each of the input registers are D flip-flops.

6. The device according to claim 1, wherein the first controller comprises a first counter and the first counter is triggered by the first clock signal to count according to the specific order so as to have the first controller enable the input registers according to the specific order.

7. The device according to claim 1, wherein the second controller comprises a second counter and the second counter is triggered by the second clock signal to count according to the specific order so as to have the second controller control the multiplexer to select the first outputs according to the specific order.

8. The device according to claim 1, wherein the asynchronous interface comprises a two-stage D flip-flop and the asynchronous interface is the second power domain, receives the initial signal and has an output terminal to transmit the initial signal to the second controller.

9. A method for implementing a first in first out device (FIFO) device, crossing a first power domain and a second power domain, the method comprising:
 receiving an input signal by a plurality of input registers wherein each of the input registers comprises a first output;
 enabling the input registers according to specific order by a first controller to generate an initial signal;
 receiving the first output by a multiplexer to select the first outputs according to the specific order to generate a second output;
 receiving the initial signal through an asynchronous interface and generating a control signal to control the multiplexer to output the second output by a second controller; and
 receiving the second output by an output register;
 wherein the input registers and the first controller belong to the first power domain; the multiplexer, the second controller, the asynchronous interface and the output register belong to the second power domain; the first power domain operates according to a first clock signal; the second power domain operates according to a second clock signal; and voltage supplied by the first power domain is different from that supplied by the second power domain.

10. The method according to claim 9, wherein the input signal is received by at least three input registers.

11. The method according to claim 9, further comprising:
 counting by a first counter wherein the first counter is triggered by the first clock signal to count according to the specific order so as to have the first controller enable the input registers according to the specific order.

12. The method according to claim 9, further comprising:
 counting by a second counter wherein the second counter is triggered by the second clock signal to count according to the specific order so as to have the second controller control the multiplexer to select the first output according to the specific order.

* * * * *